(12) United States Patent
Kim et al.

(10) Patent No.: US 12,143,163 B2
(45) Date of Patent: Nov. 12, 2024

(54) APPARATUS AND METHOD FOR CONTROLLING SIGNAL QUALITY OF ANTENNA

(71) Applicant: KMW INC., Hwaseong-si (KR)

(72) Inventors: Duk Yong Kim, Yongin-si (KR); Min Seon Yun, Anyang-si (KR)

(73) Assignee: KMW INC., Hwaseong-si (KR)

( * ) Notice: Subject to any disclaimer, the term of this patent is extended or adjusted under 35 U.S.C. 154(b) by 269 days.

(21) Appl. No.: 17/709,437

(22) Filed: Mar. 31, 2022

(65) Prior Publication Data

US 2022/0224426 A1 Jul. 14, 2022

Related U.S. Application Data

(63) Continuation of application No. PCT/KR2020/013334, filed on Sep. 29, 2020.

(30) Foreign Application Priority Data

Oct. 2, 2019 (KR) .......................... 10-2019-0122098
Mar. 27, 2020 (KR) .......................... 10-2020-0037380

(51) Int. Cl.
*H04B 17/318* (2015.01)
*H01Q 1/08* (2006.01)
(Continued)

(52) U.S. Cl.
CPC .......... *H04B 17/318* (2015.01); *H01Q 1/084* (2013.01); *H01Q 3/02* (2013.01); *H04B 17/11* (2015.01)

(58) Field of Classification Search
CPC . H04B 1/06; H04B 1/16; H04B 17/11; H04B 17/201; H04B 17/202; H04B 17/21;
(Continued)

(56) References Cited

U.S. PATENT DOCUMENTS

| 7,085,592 B1* | 8/2006 | Davies | H04B 17/20 455/67.14 |
| 8,965,276 B2* | 2/2015 | Bongfeldt | H01Q 3/38 455/129 |

(Continued)

FOREIGN PATENT DOCUMENTS

| CN | 1716829 A | 1/2006 |
| CN | 104980234 A | 10/2015 |

(Continued)

OTHER PUBLICATIONS

Extended European Search Report mailed on Sep. 21, 2023 from the European Patent Office for European Application No. 20872784.2.
(Continued)

*Primary Examiner* — Quochien B Vuong
(74) *Attorney, Agent, or Firm* — Insight Law Group, PLLC; Seung Lee (57) ABSTRACT

The present invention relates to an apparatus and method for measuring signal quality of an antenna. The apparatus according to the present invention includes a communication unit configured to receive signal quality measurement data from a plurality of terminal devices disposed at predetermined positions within a network, a signal quality calculation unit configured to calculate a signal quality measurement value of an antenna based on the signal quality measurement data received from any one of the plurality of terminal devices, a rotation determination unit configured to compare a target signal quality value of the antenna with the calculated signal quality measurement value and determine a rotation direction and an angle of the antenna on the basis of a difference value between the target signal quality value and the signal quality measurement value, and a control unit configured to transmit an adjustment signal including information on the determined rotation direction and the deter-
(Continued)

mined angle of the antenna to a clamping device configured to adjust a rotation of the antenna.

10 Claims, 9 Drawing Sheets

(51) Int. Cl.
    *H01Q 3/02*    (2006.01)
    *H04B 17/11*    (2015.01)

(58) Field of Classification Search
    CPC .... H04B 17/22; H04B 17/221; H04B 17/309; H04B 17/318; H01Q 1/08; H01Q 1/084; H01Q 3/00; H01Q 3/02; H01Q 3/04; H01Q 3/08
    See application file for complete search history.

(56) References Cited

U.S. PATENT DOCUMENTS

| | | | |
|---|---|---|---|
| 9,271,185 B2 * | 2/2016 | Abdelmonem | H04B 17/00 |
| 10,359,497 B1 * | 7/2019 | Azem | H04W 52/243 |
| 2001/0016478 A1 | 8/2001 | Lindenmeier et al. | |
| 2011/0287771 A1 | 11/2011 | Oyama | |

FOREIGN PATENT DOCUMENTS

| | | | |
|---|---|---|---|
| CN | 106252884 A | 12/2016 | |
| JP | 2004-297665 A | 10/2004 | |
| JP | 2005-051409 A | 2/2005 | |
| JP | 2005252996 A | 9/2005 | |
| JP | 2011-050599 A | 3/2011 | |
| JP | 2011-254300 A | 12/2011 | |
| JP | 2012-105209 A | 5/2012 | |
| JP | 2013-219592 A | 10/2013 | |
| JP | 2014-042313 A | 3/2014 | |
| JP | 2017-050599 A | 3/2017 | |
| JP | 2017-147715 A | 8/2017 | |
| KR | 10-0892138 B1 | 4/2009 | |
| KR | 10-2010-0032874 A | 3/2010 | |
| KR | 10-2018-0059306 A | 6/2018 | |
| WO | WO-2018049838 A1 * | 3/2018 | ............. H01Q 3/005 |

OTHER PUBLICATIONS

International Search Report mailed Jan. 5, 2021 for International Application No. PCT/KR2020/013334 and its English translation.
Notice of Allowance mailed Dec. 29, 2021 for Korean Application No. 10-2020-0037380.
Non-final Office Action mailed Mar. 28, 2023 from the Japanese Patent Office for Japanese Application No. 2022-519249.
First office action mailed on Mar. 13, 2024 from the Chinese Patent Office for the Chinese Application No. 202080069531.X.

* cited by examiner

APPARATUS AND METHOD FOR CONTROLLING SIGNAL QUALITY OF ANTENNA

CROSS-REFERENCE TO RELATED APPLICATIONS

This application is a Continuation of International Application No. PCT/KR2020/013334, filed on Sep. 29, 2020, which claims benefit of and priority to Korean Patent Application Nos. 10-2019-0122098, filed on Oct. 2, 2019; and 10-2020-0037380, filed on Mar. 27, 2020, the disclosure of which are herein incorporated by reference in their entirety.

TECHNICAL FIELD

The present invention relates to an apparatus and method for controlling signal quality of an antenna, and more particularly, to an apparatus and method for controlling signal quality of an antenna, which are capable of easily adjusting a rotation angle of an antenna and providing signal quality of the antenna at a high level of satisfaction.

BACKGROUND ART

In the related art, a signal measurement device measures signal quality while being moved within a network by a vehicle in order to optimize the network of a mobile communication base station. In this case, the network is optimized by adjusting an angle of an antenna by manually inputting vertical and/or horizontal angle adjustment values for the antenna on the basis of the signal quality measured by the signal measurement device.

However, in the related art, there is an inconvenience of having to input the calculated vertical and/or horizontal angle adjustment values one by one and manually adjusting the angles of the antenna. Further, because the vehicle needs to move each time the signal measurement device measures signals, there is a problem in that a large amount of time is required to adjust signal quality and it is difficult to measure the signal quality when the vehicle does not move.

DISCLOSURE

Technical Problem

An object of the present invention is to provide an apparatus and method for controlling signal quality of an antenna, which are capable of easily adjusting a rotation angle of an antenna by determining a rotation direction and an angle of a rotation unit and/or a tilting unit of the antenna on the basis of signal quality measured by a terminal device disposed at a predetermined position and outputting the rotation direction and the angle of the rotation unit and/or the tilting unit of the antenna to a clamping device at the time of adjusting the angle of the rotation unit and/or the tilting unit of the antenna by using the clamping device.

Another object of the present invention is to provide an apparatus and method for controlling signal quality of an antenna, which are capable of providing signal quality of the antenna at a high level of satisfaction by sequentially adjusting leftward and rightward rotations of the antenna with respect to terminal devices disposed at different positions within a network and sequentially adjusting upward and downward rotations when a target value is not satisfied.

Technical problems of the present invention are not limited to the aforementioned technical problems, and other technical problems, which are not mentioned above, may be clearly understood by those skilled in the art from the following descriptions.

Technical Solution

To achieve the above-mentioned object, an apparatus for controlling signal quality of an antenna according to an embodiment of the present invention includes: a communication unit configured to sequentially receive signal quality measurement data from a plurality of terminal devices disposed at predetermined positions within a network; a signal quality calculation unit configured to calculate a signal quality measurement value of an antenna based on the signal quality measurement data received from any one of the plurality of terminal devices; and a rotation determination unit configured to compare a target signal quality value of the antenna with the calculated signal quality measurement value and determine a rotation direction and an angle of the antenna on the basis of a difference value between the target signal quality value and the signal quality measurement value, in which a rotation of a clamping device is adjusted on the basis of an adjustment signal including information on the determined rotation direction and the determined angle of the antenna.

In this case, the apparatus may further include a control unit configured to transmit the adjustment signal to the clamping device to adjust a rotation of the antenna. The control unit may request the signal quality measurement data in a predetermined order from any one of the plurality of terminal devices, and the control unit may request the signal quality measurement data from the next terminal device after the rotation of the antenna is adjusted on the basis of the adjustment signal.

The rotation determination unit may determine a rotation direction of the antenna as a direction identical to a previously determined rotation direction when a second difference value between the target signal quality value of the antenna and a signal quality measurement value calculated on the basis of the signal quality measurement data received from the next terminal device is smaller than a first difference value calculated previously, and the rotation determination unit may determine a rotation direction of the antenna as a direction opposite to the previously determined rotation direction when the second difference value is equal to or larger than the first difference value calculated previously.

The rotation determination unit may determine that the signal quality of the antenna does not satisfy a target value and determine a rotation angle in a leftward/rightward direction of the antenna when the difference value is not 0 or deviates from a predetermined error range.

The control unit may request again the signal quality measurement data in the predetermined order from any one of the plurality of terminal devices when the signal quality of the antenna does not satisfy the target value after the rotation angle in the leftward/rightward direction of the antenna is adjusted on the basis of the signal quality measurement data sequentially received from the plurality of terminal devices.

The rotation determination unit may determine a rotation angle in an upward/downward direction of the antenna when the signal quality measurement data received from the terminal device are data received again.

The control unit may determine to stop the rotation of the antenna when the signal quality of the antenna satisfies the target value after the rotation angle in the leftward/rightward direction of the antenna is adjusted on the basis of the signal quality measurement data sequentially received from the plurality of terminal devices.

The clamping device may include: a tilting unit to which the antenna is coupled to be tiltable in an upward/downward direction; and a rotation unit to which the antenna is coupled to be rotatable in a leftward/rightward direction, and the control unit may transmit the adjustment signal to the clamping device, may tilt the antenna in the upward/downward direction by using the tilting unit, and may rotate the antenna in the leftward/rightward direction by using the rotation unit.

When the clamping device receives the adjustment signal, the clamping device may operate a tilting rotation motor included in the tilting unit and configured to electrically operate to tilt the tilting unit in the upward/downward direction, and the clamping device may operate a rotating rotation motor included in the rotation unit and configured to electrically operate to rotate the rotation unit in the leftward/rightward direction.

To achieve the above-mentioned object, a method of controlling signal quality of an antenna according to another embodiment of the present invention includes: requesting signal quality measurement data in a predetermined order from any one of a plurality of terminal devices disposed at predetermined positions within a network; calculating a signal quality measurement value of the antenna on the basis of the signal quality measurement data received from any one of the terminal devices; comparing a target signal quality value of the antenna with the calculated signal quality measurement value and determining a rotation direction and angle of the antenna on the basis of a difference value between the target signal quality value and the signal quality measurement value; and transmitting an adjustment signal including information on the determined rotation direction and the determined angle of the antenna to a clamping device configured to adjust a rotation of the antenna.

Advantageous Effects

According to the present invention, it is possible to easily adjust a rotation angle of an antenna by determining a rotation direction and an angle of a rotation unit and/or a tilting unit of the antenna on the basis of signal quality measured by a terminal device disposed at a predetermined position and outputting the rotation direction and the angle of the rotation unit and/or the tilting unit of the antenna to a clamping device at the time of adjusting the angle of the rotation unit and/or the tilting unit of the antenna by using the clamping device.

In addition, according to the present invention, it is possible to provide signal quality of the antenna at a high level of satisfaction by sequentially adjusting leftward and rightward rotations of the antenna with respect to terminal devices disposed at different positions within a network and sequentially adjusting upward and downward rotations when a target value is not satisfied.

DESCRIPTION OF MAIN REFERENCE NUMERALS OF DRAWINGS

1: Antenna
10: Clamping device
20: Terminal device
21: First terminal
22: Second terminal
23: Third terminal
24: Fourth terminal
100: Signal quality control apparatus
110: Control unit
120: Communication unit
130: Storage unit
140: Signal quality calculation unit
150: Rotation determination unit

BEST MODE

Hereinafter, some embodiments of the present invention will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the exemplary embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Figure 1:
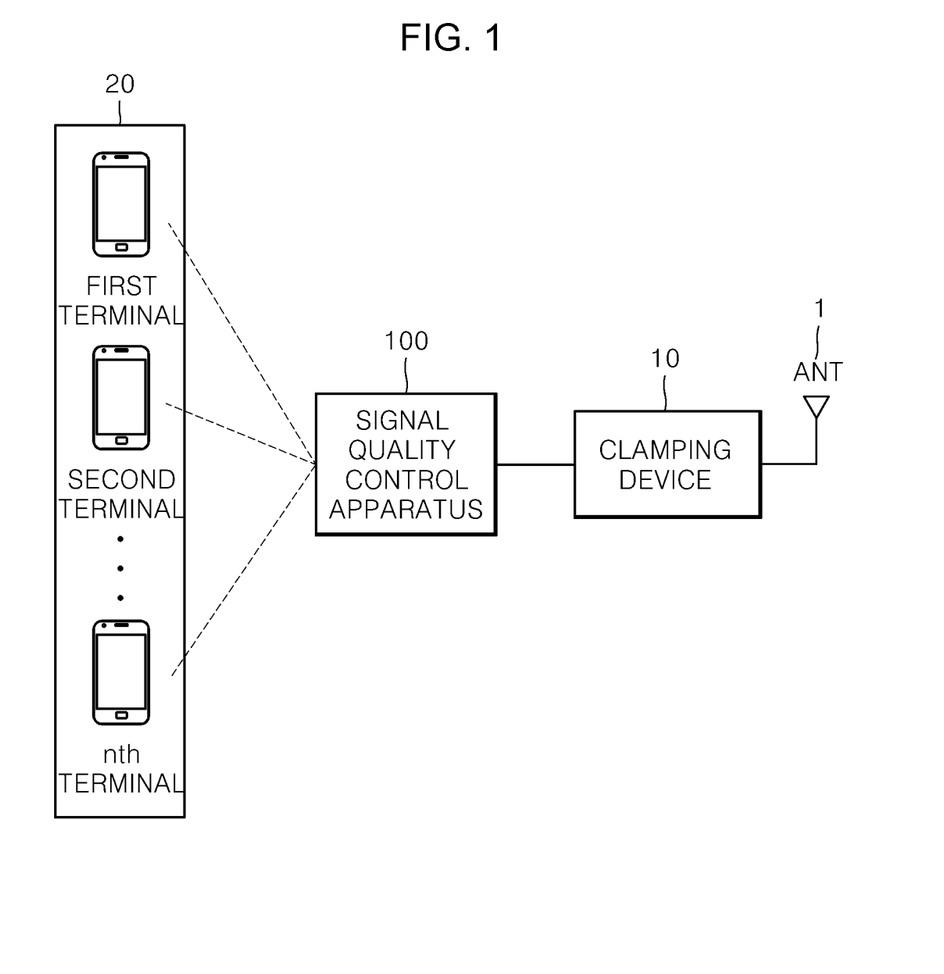
FIG. 1 is a view illustrating a configuration of a system to which an apparatus for controlling signal quality of an antenna according to an embodiment of the present invention is applied.
Figure 2:
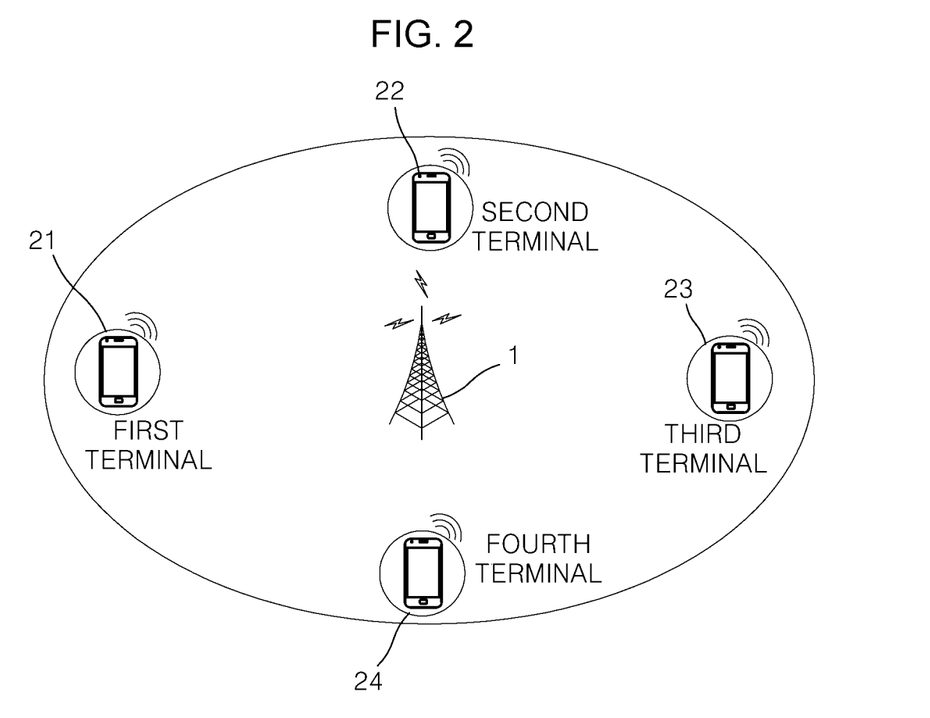
FIG. 2 is a view illustrating an embodiment in which an electronic terminal is disposed in the system to which the apparatus for controlling signal quality of an antenna according to the embodiment of the present invention is applied.
Figure 3:
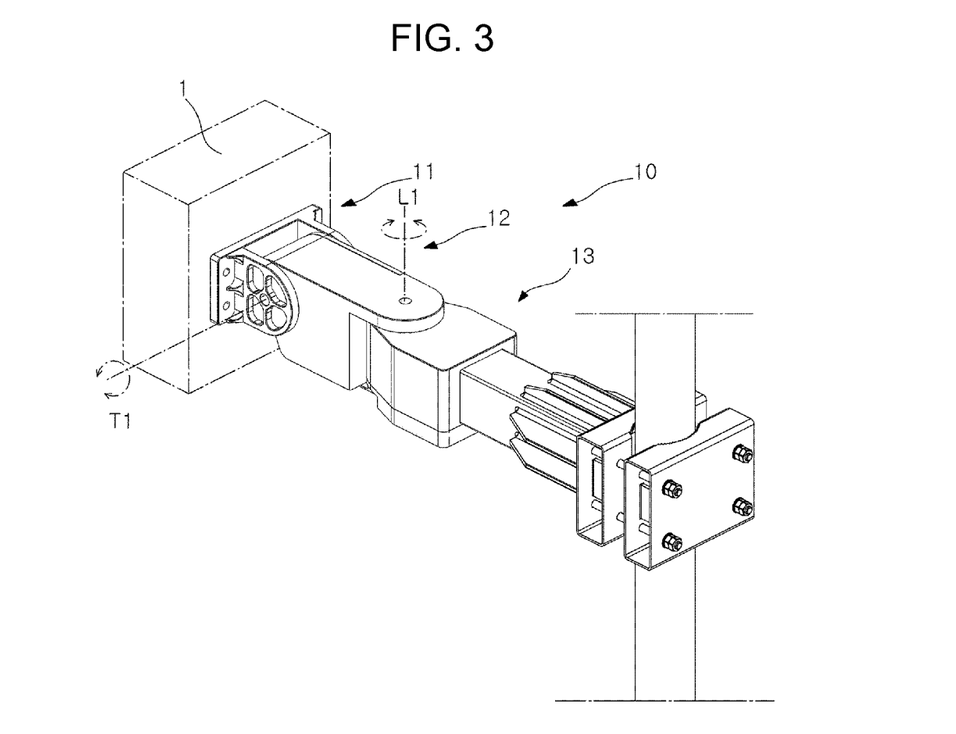
FIG. 3 is a perspective view illustrating a clamping device configured to tilt the antenna in an upward/downward direction and rotate the antenna in a leftward/rightward direction.
Figure 4:
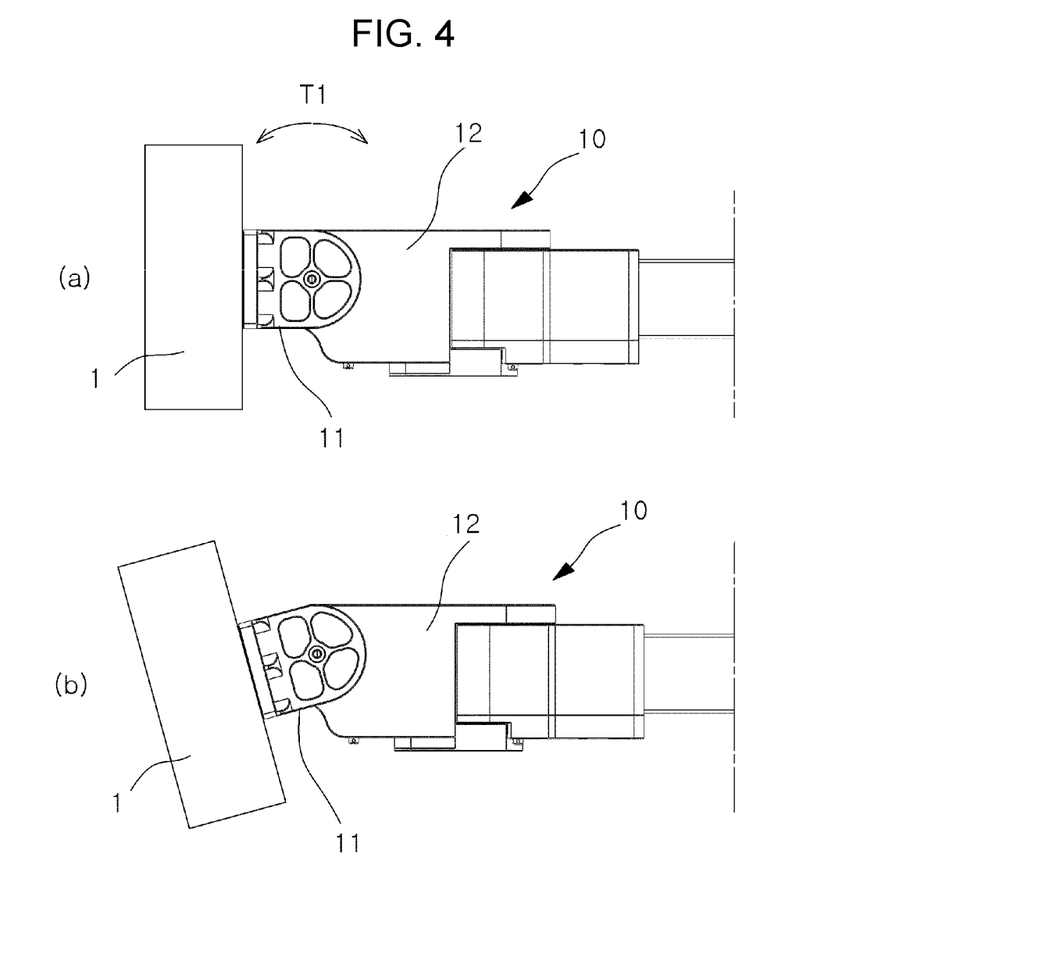
FIGS. 4 and 5 are views illustrating states in which the antenna is tilted and rotated by the clamping device illustrated in FIG. 3.
Figure 5:
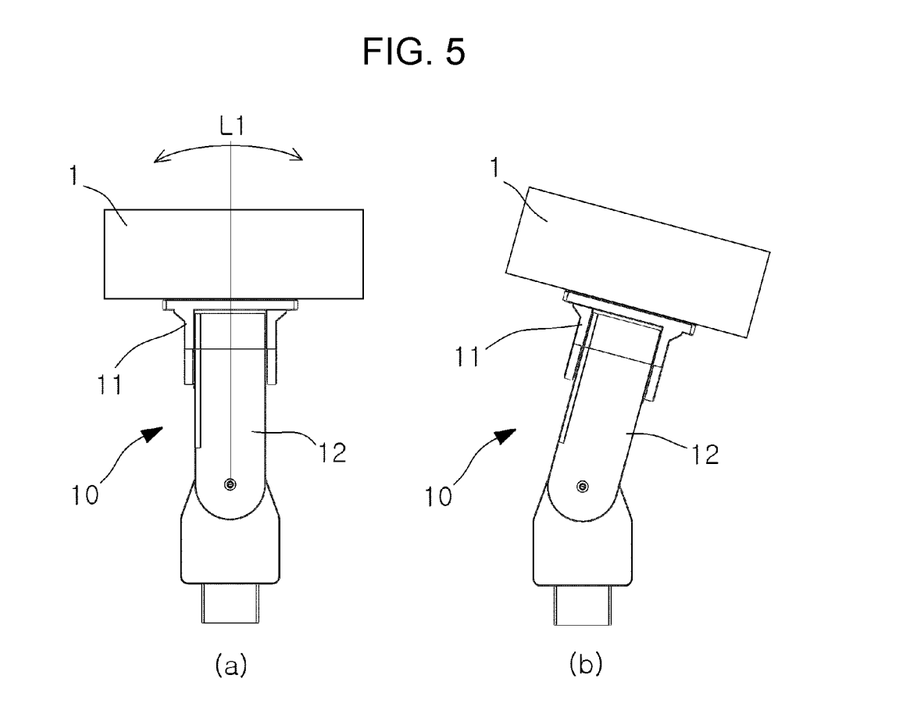

FIG. 1 is a view illustrating a configuration of a system to which an apparatus according to an embodiment of the present invention is applied, FIG. 2 is a view illustrating an embodiment in which an electronic terminal is disposed in the system to which the apparatus for controlling signal quality of an antenna according to the embodiment of the present invention is applied, FIG. 3 is a perspective view illustrating a clamping device configured to tilt the antenna in an upward/downward direction and rotate the antenna in a leftward/rightward direction, and FIGS. 4 and 5 are views illustrating states in which the antenna is tilted and rotated by the clamping device illustrated in FIG. 3.

Referring to FIG. 1, the system may include: an antenna 1; a clamping device 10 configured to adjust a rotation angle of the antenna 1 in a leftward/rightward direction and/or an upward/downward direction; a plurality of terminal devices 20 disposed at predetermined positions within a network and configured to measure signal quality of the antenna 1; and a signal quality control apparatus 100 configured to determine a rotation of the antenna 1 on the basis of the signal quality measured by the terminal device 20 and transmit the rotation of the antenna 1 to the clamping device 10.

The antenna 1 may include a transmitting antenna module (not illustrated) configured to transmit a predetermined signal to an external communication device, and a receiving antenna module (not illustrated) configured to receive a signal transmitted from the external communication device.

For example, the transmitting antenna module may transmit a signal for requesting quality measurement data to the terminal device 20 disposed at the predetermined position within the network, and the receiving antenna module may receive quality measurement data transmitted from the corresponding terminal device 20. In this case, the receiving antenna module may sequentially receive the quality measurement data from the plurality of terminals disposed within the network.

In this case, the antenna 1 may be provided as a plurality of antennas in different embodiments.

The clamping device 10 may include a tilting unit 11 coupled to the antenna 1 so that the antenna 1 may tilt in the upward/downward direction, and a rotation unit 12 coupled to the antenna 1 so that the antenna 1 may rotate in the leftward/rightward direction. In this case, the tilting unit 11 and/or the rotation unit 12 may be coupled directly to a support pole (no reference numeral) for installing the antenna 1 or coupled indirectly to the support pole by another unit (e.g., a coupling unit denoted by reference numeral 13 illustrated in FIG. 3).

When the clamping device 10 receives a rotation angle adjustment value in the leftward/rightward direction from the signal quality control apparatus 100, the clamping device 10 operates the rotation unit 12 to rotate the antenna 1 by a predetermined angle in the leftward/rightward direction.

In addition, when the clamping device 10 receives a rotation angle adjustment value in the upward/downward direction from the signal quality control apparatus 100, the clamping device 10 operates the tilting unit 11 to tilt the antenna 1 by a predetermined angle in the upward/downward direction.

The plurality of terminal devices 20 serves to measure the signal quality of the antenna 1 and provide the measured quality measurement data. Positions of the plurality of terminal devices 20 may be fixed, or the plurality of terminal devices 20 may be moved.

In this case, the plurality of terminal devices 20, e.g., a first terminal 21, a second terminal 22, a third terminal 23, and a fourth terminal 24 may be disposed at different positions within the network. This embodiment will be described with reference to FIG. 2.

As illustrated in FIG. 2, the first terminal 21, the second terminal 22, the third terminal 23, and the fourth terminal 24 measure quality of the signals transmitted to or received from the antenna 1 at the respective positions thereof. In this case, the first terminal 21, the second terminal 22, the third terminal 23, and the fourth terminal 24 measure the signal quality of the antenna 1 and transmit quality measurement data to the signal quality control apparatus 100 when the quality measurement data are requested by the signal quality control apparatus 100.

The plurality of terminal devices 20 may be electronic terminals having communication functions.

For example, the electronic terminal may be implemented in the form of a mobile phone, a tablet personal computer (PC), a desktop PC, a laptop PC, a netbook computer, a personal digital assistant (PDA), a portable multimedia player (PMP), or the like.

Meanwhile, the terminal device 20 may be implemented in the form of a drone or mounted on the drone. In this case, a single terminal device 20 may be provided. The terminal device 20 may measure the signal quality of the antenna 1 at a target position while moving by using characteristics of the drone.

The signal quality control apparatus 100 requests the quality measurement data from any one of the plurality of terminal devices 20 disposed at the predetermined positions within the network. The signal quality control apparatus 100 determines the rotation angle adjustment value of the antenna 1 in the leftward/rightward direction and/or the upward/downward direction on the basis of the quality measurement data received from the corresponding terminal device 20 and transmits an adjustment signal including the determined rotation angle adjustment value to the clamping device 10.

After transmitting the adjustment signal to the clamping device 10, the signal quality control apparatus 100 request the quality measurement data from the next terminal device 20 of the plurality of terminal devices 20. Likewise, the signal quality control apparatus 100 may determine the rotation angle adjustment value of the antenna 1 in respect to the rotating in the leftward/rightward direction and/or the tilting in the upward/downward direction on the basis of the quality measurement data received from the corresponding terminal device 20 and transmit the adjustment signal including the determined rotation angle adjustment value to the clamping device 10.

As described above, the signal quality control apparatus 100 may sequentially determine the rotation angle adjustment value of the antenna 1 in the leftward/rightward direction and/or the upward/downward direction by using the signal quality data sequentially received from the plurality of terminal devices 20.

Therefore, the clamping device 10 sequentially adjusts the rotation angle of the antenna 1 in the leftward/rightward direction and/or the upward/downward direction.

In more detail, referring to FIG. 3, the clamping device 10 transmits a signal for requesting quality measurement data to the terminal device 20 through the transmitting antenna module and then measures the current signal quality of the antenna 1 by receiving the quality measurement data transmitted from the corresponding terminal device 20 through the receiving antenna module. The clamping device 10 may tilt the antenna 1 in the upward/downward direction by using the tilting unit 11 and rotate the antenna 1 in the leftward/rightward direction by using the rotation unit 12 on the basis of the rotation angle adjustment value determined by the signal quality control apparatus 100.

Although not illustrated in the drawings, the clamping device 10 may include a tilting rotation motor configured to electrically operate and provide tilting rotation driving power for the tilting unit 11, and a rotating rotation motor configured to electrically operate and provide rotating rotation driving power for the rotation unit 12. The tilting rotation motor and the rotating rotation motor may be supplied with power from a separate power source unit provided outside the clamping device 10.

When a tilting rotation angle adjustment value for the clamping device 10 is received from a control unit 110 which will be described below among the components of the signal quality control apparatus 100, the tilting unit 11 may adjust the directionality of the antenna 1 while tilting in the upward/downward direction about a tilting rotation point T1 of the tilting unit 11, as illustrated in FIGS. 3 and 4.

Further, when a rotating rotation angle adjustment value for the clamping device 10 is received from the control unit 110 which will be described below among the components of the signal quality control apparatus 100, the rotation unit 12 may adjust the directionality of the antenna 1 while rotating in the leftward/rightward direction about a rotating rotation point L1 of the rotation unit 12, as illustrated in FIGS. 3 and 5.

The signal quality control apparatus 100 according to the present invention may be implemented as an apparatus provided separately from the clamping device 10 and may communicate with and be connected to the clamping device 10 by means of a separate communication connection means.

Meanwhile, the signal quality control apparatus 100 may be implemented in the clamping device 10.

A detailed description of a specific configuration and operation of the signal quality control apparatus 100 will be described in detail with reference to the embodiment illustrated in FIG. 6 and the following drawings.

Figure 6:
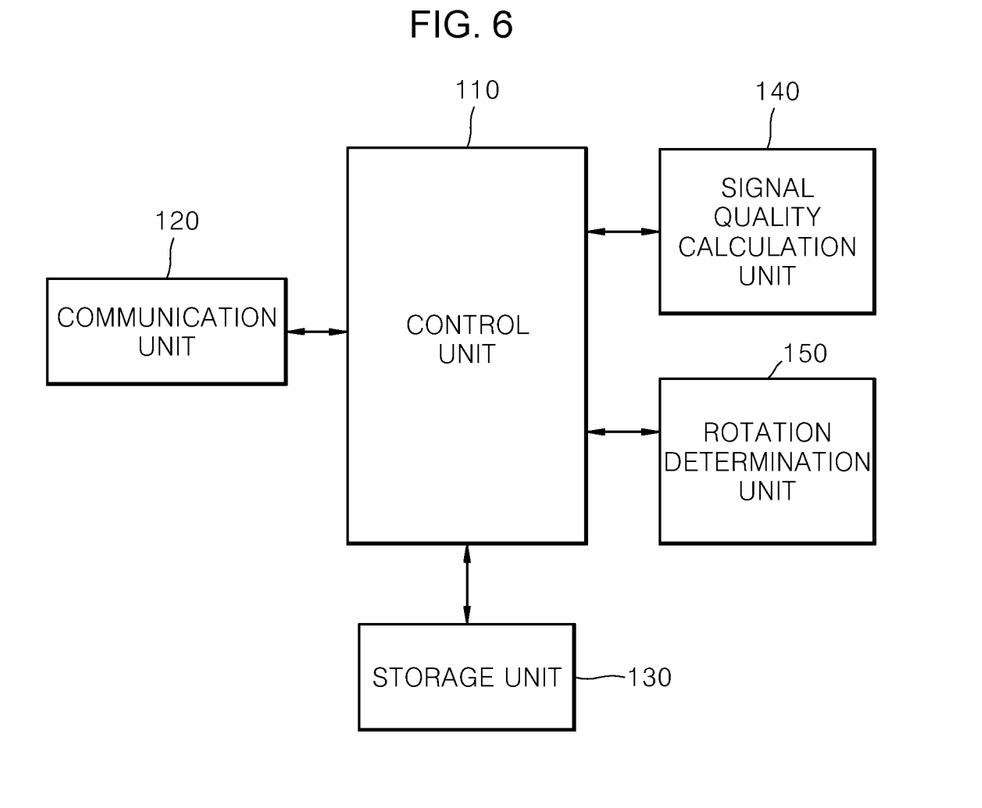
FIG. 6 is a view illustrating a configuration of the apparatus for controlling signal quality of an antenna according to the embodiment of the present invention.

FIG. 6 is a view illustrating a configuration of the signal quality control apparatus according to the embodiment of the present invention. Referring to FIG. 6, the signal quality control apparatus 100 may include the control unit 110, a communication unit 120, a storage unit 130, a signal quality calculation unit 140, and a rotation determination unit 150. In this case, the control unit 110, the signal quality calculation unit 140, and/or the rotation determination unit 150 of the signal quality control apparatus 100 according to the present embodiment may be implemented as one or more processors.

First, the control unit 110 may process signals transmitted between the components of the signal quality control apparatus 100.

The communication unit 120 may include a first communication module configured to support a communication interface with the plurality of terminal devices 20 disposed at the predetermined positions within the network.

For example, the first communication module may include a module or short-range communication for wireless Internet access.

In this case, the wireless Internet technologies include wireless LAN (WLAN), wireless broadband (Wibro), Wi-Fi, and/or world interoperability for microwave access (Wimax). In addition, the short-range communication technologies may include Bluetooth, ZigBee, ultra-wideband (UWB), radio frequency identification (RFID), and/or infrared data association (IrDA).

Meanwhile, the communication unit 120 may further include a second communication module configured to support a communication interface with the clamping device 10. In this case, the second communication module may support wired or wireless communication technologies.

The storage unit 130 may store data and/or algorithms required to operate the signal quality control apparatus 100.

For example, the storage unit 130 may store commands and/or algorithms used to calculate the signal quality measurement value on the basis of the data received from an Nth terminal device 20 among the plurality of terminal devices 20. In addition, the storage unit 130 may store commands and/or algorithms used to determine the rotation direction and the angle of the antenna 1 on the basis of the signal quality of the antenna 1 calculated previously.

In this case, the storage unit 130 may include a storage medium such as a random-access memory (RAM), a static random-access memory (SRAM), a read-only memory (ROM), a programmable read-only memory (PROM), and/or an electrically erasable programmable read-only memory (EEPROM).

The control unit 110 may request the signal quality measurement data through the communication unit 120 from any one of the plurality of terminal devices 20 disposed within the network.

For example, assuming that the plurality of terminal devices 20 disposed within the network includes the first terminal 21, the second terminal 22, the third terminal 23, and the fourth terminal 24 and the first to fourth terminals 21, 22, 23, and 24 are disposed at different positions within the network, the control unit 110 may request the signal quality measurement data from the first terminal 21.

In this case, when the control unit 110 completes the measurement of the signal quality of the antenna 1 on the basis of first data, i.e., the signal quality measurement data received from the first terminal 21, the control unit 110 may request the signal quality measurement data from the next second terminal 22.

In addition, when the control unit 110 completes the measurement of the signal quality of the antenna 1 on the basis of second data, i.e., the signal quality measurement data received from the second terminal 22, the control unit 110 may request the signal quality measurement data from the next third terminal 23.

Likewise, when the control unit 110 completes the measurement of the signal quality of the antenna 1 on the basis of third data, i.e., the signal quality measurement data received from the third terminal 23, the control unit 110 may request the signal quality measurement data from the next fourth terminal 24.

The control unit 110 may stop a related operation when the control unit 110 completes the measurement of the signal quality of the antenna 1 on the basis of fourth data, i.e., the signal quality measurement data received from the fourth terminal 24 and the measured signal quality of the antenna 1 satisfies a target value.

Meanwhile, when the signal quality of the antenna 1 measured on the basis of the fourth data does not satisfy the target value, the control unit 110 may request the signal quality measurement data again sequentially from the first to fourth terminals 21, 22, 23, and 24.

The signal quality calculation unit 140 calculates the signal quality of the antenna 1 on the basis of the signal quality measurement data received from the plurality of terminal devices 20 disposed within the network. In this case, when receiving the signal quality measurement data from any one of the plurality of terminal devices 20, the signal quality calculation unit 140 calculates the signal quality of the antenna 1 on the basis of the signal quality measurement data received from the corresponding terminal device 20.

The signal quality calculation unit 140 may store the calculated signal quality measurement value in the storage unit 130 or transmit the calculated signal quality measurement value to the rotation determination unit 150 and/or the control unit 110.

Thereafter, when receiving the signal quality measurement data from the next terminal device 20, the signal quality calculation unit 140 may calculate the signal quality of the antenna 1 on the basis of the received signal quality measurement data.

In this case, the signal quality calculation unit 140 may acquire the signal quality measurement value by using an algorithm that calculates the signal quality measurement value on the basis of the signal quality measurement data received from the terminal device 20.

In this case, a least mean square (LMS) algorithm, a recursive least square (RLS) algorithm, and the like may be applied as the algorithm for calculating the signal quality measurement value, and an algorithm, which less causes an error, may be applied in different embodiments.

For example, the RLS algorithm may calculate a target signal quality value by calculating noise power before and after noise filtering is performed on transmitted signals. In addition, the RLS algorithm may calculate noise power before and after noise filtering is performed on received signals including the signal quality measurement data. The RLS algorithm may calculate the signal quality measurement value at the corresponding position.

Because the algorithm for measuring the signal quality of the received signal is a general technology, a specific description thereof will be omitted.

The rotation determination unit 150 may compare a target signal quality value QR based on the transmitted signal of the antenna 1 with a signal quality measurement value QN calculated by the signal quality calculation unit 140 and determine the rotation direction and the angle of the antenna 1 on the basis of a difference value (QR−QN) between the target signal quality value QR and the signal quality measurement value QN.

In this case, when a difference value (QR−Q1) between the target signal quality value QR and a signal quality measurement value Q1 is 0, the rotation determination unit 150 may determine that the signal quality of the antenna 1 satisfies the target value and determine not to rotate the antenna 1. In addition, when the difference value (QR−Q1) between the target signal quality value QR and the signal quality measurement value Q1 is not 0 but within an error range, the rotation determination unit 150 may determine that the signal quality of the antenna 1 satisfies the target value and determine not to rotate the antenna 1.

Meanwhile, when the difference value (QR−Q1) between the target signal quality value QR and the signal quality measurement value Q1 is not 0 or deviates from the error range, the rotation determination unit 150 may determine that the signal quality of the antenna 1 does not satisfy the target value and determine to rotate the antenna 1 in the leftward or rightward direction. In this case, the rotation determination unit 150 may determine different rotation directions depending on whether the difference value (QR−Q1) is a positive (+) value or a negative (−) value.

The rotation determination unit 150 may determine the rotation angle as a predetermined angle. Meanwhile, the rotation determination unit 150 may determine different rotation angles depending on magnitudes of the difference value (QR−Q1).

When the rotation direction and the angle of the antenna 1 are determined by the rotation determination unit 150, the control unit 110 transmits a first adjustment signal including information on the rotation direction and the angle of the antenna 1 to the clamping device 10 connected to the communication unit 120.

Therefore, the clamping device 10 may rotate the antenna 1 by a predetermined angle in the leftward/rightward direction on the basis of the first adjustment signal received through the communication unit 120.

Meanwhile, when a signal quality measurement value Q2 calculated on the basis of the second measurement data is transmitted from the signal quality calculation unit 140 after the rotation determination unit 150 determines the rotation direction and the angle of the antenna 1 based on the signal quality measurement value Q1 calculated on the basis of the first measurement data, the rotation determination unit 150 may compare the target signal quality value QR based on the transmitted signal of the antenna 1 with the signal quality measurement value Q2 and determine the rotation direction and the angle of the antenna 1 on the basis of the difference value (QR−Q2).

In this case, when the difference value (QR−Q2) is 0 or within an error range, the rotation determination unit 150 may determine that the signal quality of the antenna 1 satisfies the target value and determine not to rotate the antenna 1.

In contrast, when the difference value (QR−Q2) is not 0 or deviates from the error range, the rotation determination unit 150 may determine that the signal quality of the antenna 1 does not satisfy the target value and determine to rotate the antenna 1 in the leftward or rightward direction. In this case, the rotation determination unit 150 may determine a rotation direction as a direction identical to the previous rotation direction when the difference value (QR−Q2) is smaller than the difference value (QR−Q1) calculated previously. When the second difference is equal to or larger than the first difference value calculated previously, the rotation determination unit 150 may determine a rotation direction as a direction opposite to the previous rotation direction.

The rotation determination unit 150 may determine the rotation angle as a predetermined angle. Meanwhile, the rotation determination unit 150 may determine different rotation angles depending on magnitudes of the difference values.

When the rotation determination unit 150 determines the rotation direction and the angle of the antenna 1, the control unit 110 transmits a second adjustment signal including information on the rotation direction and the angle of the antenna 1 to the clamping device 10 connected to the communication unit 120.

Therefore, the clamping device 10 may rotate again the antenna 1, which has the previously adjusted angle, by a predetermined angle in the leftward/rightward direction on the basis of the second adjustment signal received through the communication unit 120.

In such a manner, the control unit 110 may sequentially transmit a third adjustment signal and a fourth adjustment signal to the clamping device 10. In addition, the clamping device 10 may rotate the antenna 1 by a predetermined angle in the leftward/rightward direction on the basis of the received third and fourth adjustment signals.

Meanwhile, when the signal quality measurement value Q1 calculated on the basis of the first measurement data is transmitted again after the antenna 1 rotates in the leftward/rightward direction, the rotation determination unit 150 may compare the target signal quality value QR based on the transmitted signal of the antenna 1 with the signal quality measurement value Q1 and determine the rotation direction and the angle of the antenna 1 on the basis of the difference value (QR−Q1).

In this case, the rotation determination unit 150 may determine the rotation direction and the angle with the above-mentioned method. Because the antenna 1 is in the state of being rotated in the leftward/rightward direction by the previous process, the rotation determination unit 150 may determine the rotation direction of the antenna 1 as the upward/downward direction.

Therefore, the control unit 110 may sequentially transmit the first adjustment signal, the second adjustment signal, the third adjustment signal, and the fourth adjustment signal based on the upward/downward direction to the clamping device 10.

The clamping device 10 may rotate the antenna 1 by a predetermined angle in the upward/downward direction on the basis of the received first to fourth adjustment signals. Therefore, the control unit 110 may stop the related operation when the signal quality of the antenna 1 measured by the upward and downward rotations of the antenna 1 satisfies the target value.

Meanwhile, when the signal quality of the antenna 1 measured by the upward and downward rotations of the antenna 1 does not satisfy the target value, the control unit 110 may request again the signal quality measurement data sequentially from the first to fourth terminals 21, 22, 23, and 24.

The signal quality control apparatus 100 according to the present embodiment, which operates as described above, may be implemented in the form of an independent hardware apparatus or implemented in the form of one or more processors included in other hardware apparatuses such as a microprocessor or general-purpose computer system.

The processor may be a central processing unit (CPU) or a semiconductor device that processes instructions stored in a memory and/or a storage.

Figure 7:
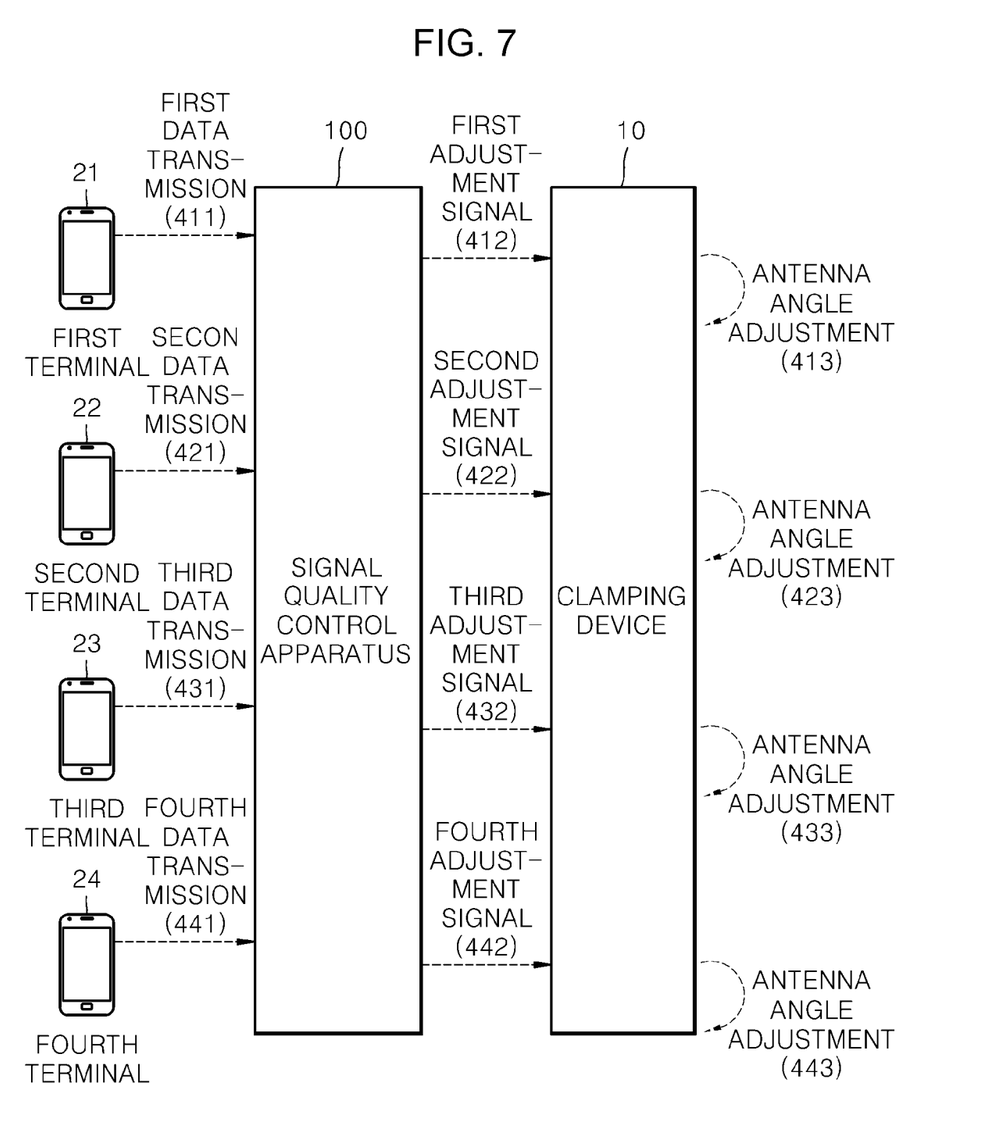
FIG. 7 is a view illustrating an embodiment for explaining an operation of the apparatus for controlling signal quality of an antenna according to the embodiment of the present invention.

FIG. 7 is a view illustrating an embodiment for explaining an operation of the apparatus for controlling signal quality of an antenna according to the embodiment of the present invention.

Referring to FIG. 7, in operation 411, the first terminal 21 transmits the first data on the basis of the request of the signal quality control apparatus 100.

The signal quality control apparatus 100 determines the rotation direction and the angle of the antenna 1 on the basis of the signal quality of the first data. In operation 412, the signal quality control apparatus 100 transmits the first adjustment signal including the determined rotation direction and the determined angle to the clamping device 10.

Therefore, in operation 413, the clamping device 10 may adjust the rotation angle of the antenna 1 on the basis of the first adjustment signal.

When the primary adjustment of the angle of the antenna is completed, in operation 421, the second terminal 22 transmits the second data on the basis of the request of the signal quality control apparatus 100.

The signal quality control apparatus 100 determines the rotation direction and the angle of the antenna 1 on the basis of the signal quality of the second data. In operation 422, the signal quality control apparatus 100 transmits the second adjustment signal including the determined rotation direction and the determined angle to the clamping device 10.

Therefore, in operation 423, the clamping device 10 may adjust again the rotation angle of the antenna 1 on the basis of the second adjustment signal.

When the secondary adjustment of the angle of the antenna 1 is completed, in operation 431, the third terminal 23 transmits the third data on the basis of the request of the signal quality control apparatus 100.

The signal quality control apparatus 100 determines the rotation direction and the angle of the antenna 1 on the basis of the signal quality of the third data. In operation 432, the signal quality control apparatus 100 transmits the third adjustment signal including the determined rotation direction and the determined angle to the clamping device 10.

Therefore, in operation 433, the clamping device 10 may adjust again the rotation angle of the antenna 1 on the basis of the third adjustment signal.

When the tertiary adjustment of the antenna 1 is completed, in operation 441, the fourth terminal 24 transmits the fourth data on the basis of the request of the signal quality control apparatus 100.

The signal quality control apparatus 100 determines the rotation direction and the angle of the antenna 1 on the basis of the signal quality of the fourth data. In operation 442, the signal quality control apparatus 100 transmits the fourth adjustment signal including the determined rotation direction and the determined angle to the clamping device 10.

Therefore, in operation 443, the clamping device 10 may adjust again the rotation angle of the antenna 1 on the basis of the fourth adjustment signal.

As described above, in operations 411, 412, 413, 421, 422, 423, 431, 432, 433, 441, 442, and 443, the leftward and rightward rotations of the antenna 1 may be preferentially adjusted. When the signal quality of the antenna 1 does not satisfy the target value, operations 411, 412, 413, 421, 422, 423, 431, 432, 433, 441, 442, and 443 are performed again to adjust the upward and downward rotations of the antenna 1. In this case, the signal quality control apparatus 100 may sequentially receive the first to fourth data from the plurality of terminal devices 20, e.g., the first to fourth terminals 21, 22, 23, and 24. Alternatively, the signal quality control apparatus 100 may receive the first to fourth data simultaneously.

Specifically, regarding operations 411, 421, 431, and 441 illustrated in FIG. 7, when the first to fourth terminals 21, 22, 23, and 24 are disposed at spatially different positions, the first to fourth data may be sequentially or simultaneously transmitted to the signal quality control apparatus 100. In a case in which the terminal device 20 is implemented in the form of a drone or mounted on a drone, a plurality of quality measurement data (e.g., first to fourth data) may be sequentially transmitted to the communication unit 120 of the signal quality control apparatus 100 as the positions of the terminal devices 20 are changed.

An operation flow of the apparatus for controlling signal quality of an antenna according to the present invention configured as described above will be described below in more detail.

Figure 8:
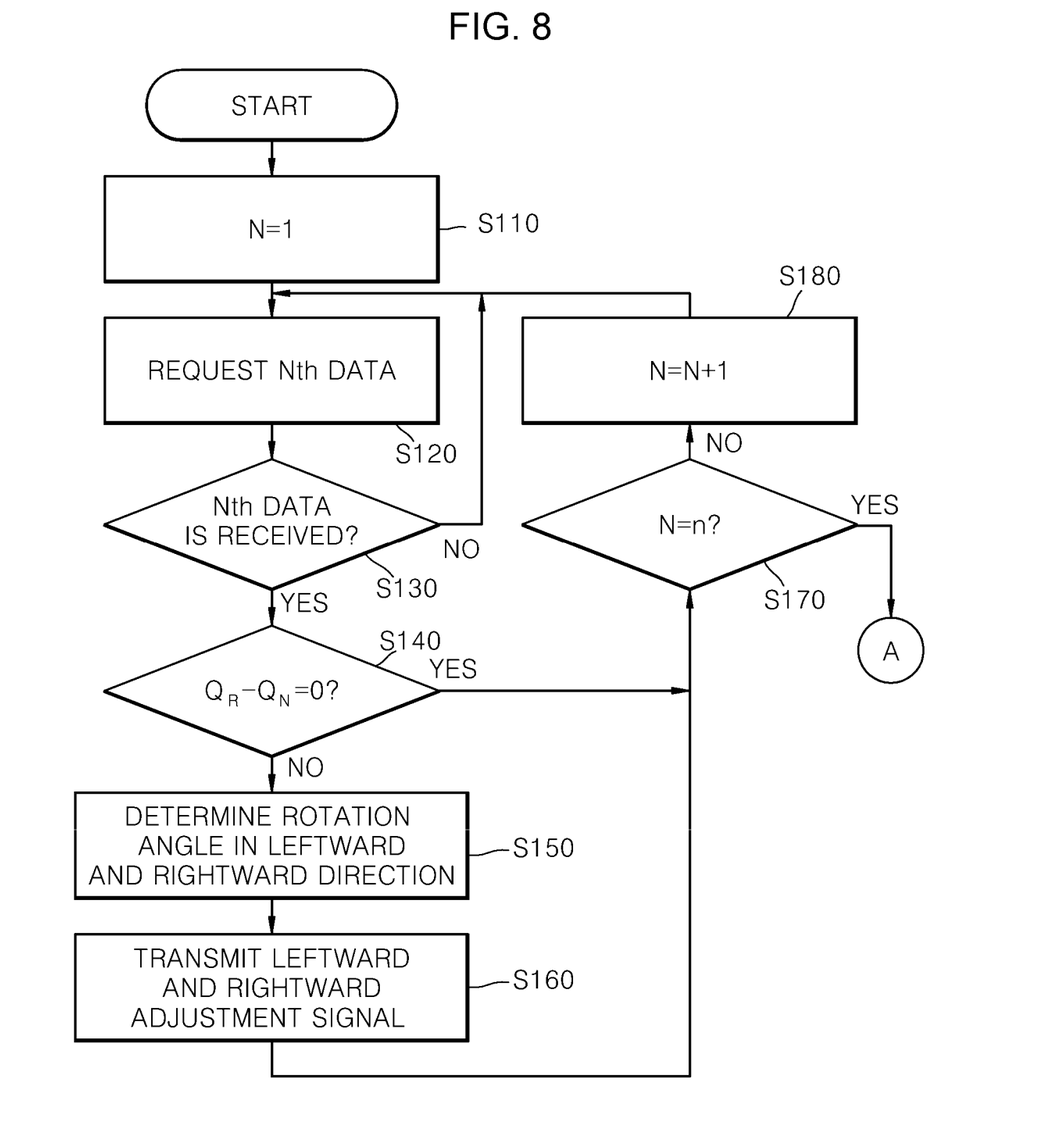
FIGS. 8 and 9 are views illustrating an operation flow of a method of controlling signal quality of an antenna according to the embodiment of the present invention.
Figure 9:
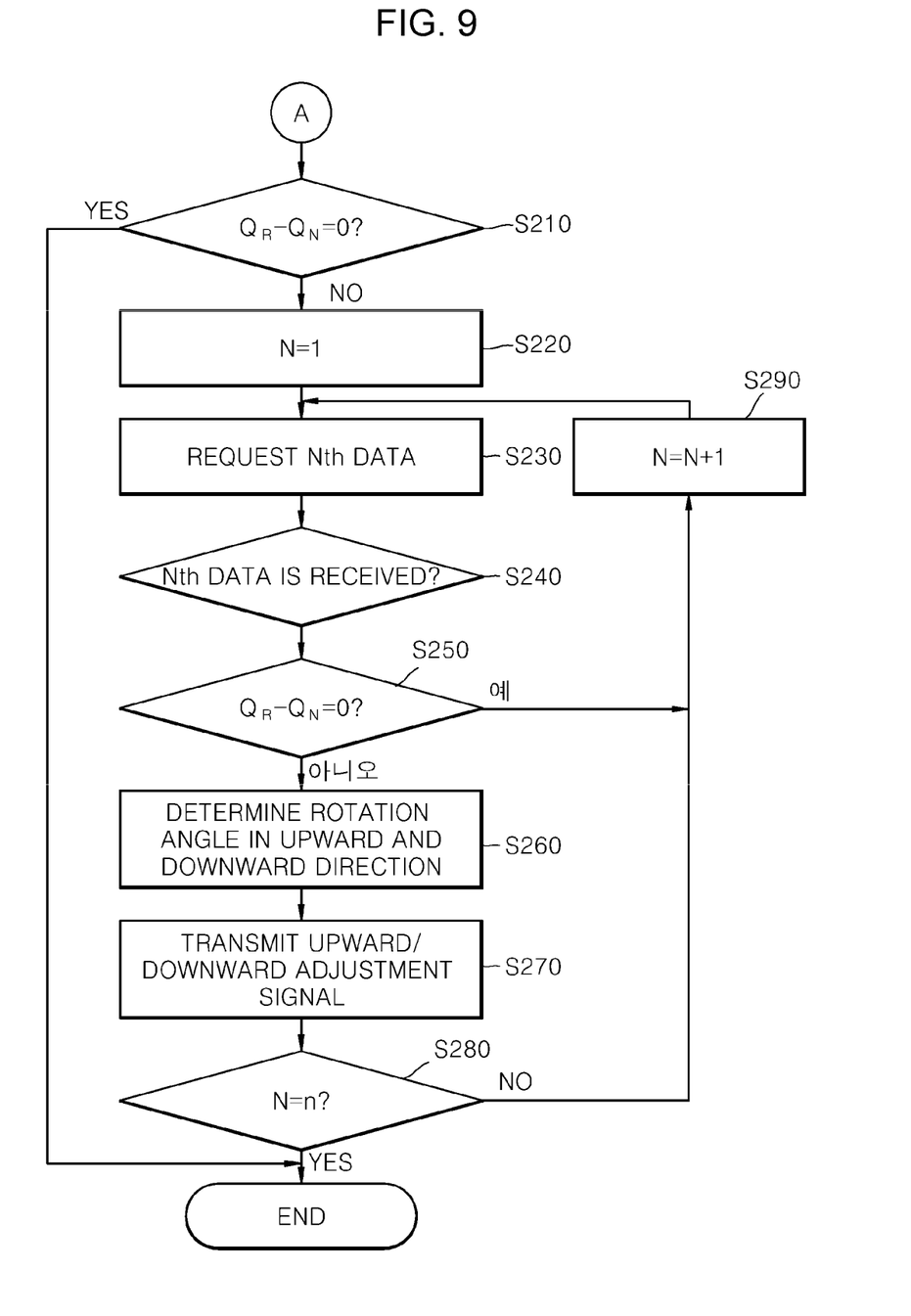

FIGS. 8 and 9 are views illustrating an operation flow of a method of controlling signal quality of an antenna according to the embodiment of the present invention.

Referring to FIG. 8, the signal quality control apparatus 100 requests the first data from the first terminal 21 among n terminal devices 20 disposed within the network (S110 and S120).

When the signal quality control apparatus 100 receives the first data from the first terminal 21 (S130), the signal quality control apparatus 100 checks whether the difference value between the target signal quality value QR based on the transmitted signal of the antenna 1 and the signal quality measurement value Q1 based on the first data is 0 (or within the error range). When the difference value is 0 (or within the error range) (S140), the signal quality control apparatus 100 requests the second data from the next second terminal 22 (S170, S180, and S120).

Meanwhile, when the difference value is not 0 (or within the error range) in step 'S140', the signal quality control apparatus 100 preferentially determines a rotation direction as the leftward/rightward direction and determines the rotation angle in the leftward/rightward direction (S150). In this case, the signal quality control apparatus 100 may determine the rotation angle on the basis of the difference value in step 'S140' or determine the rotation angle as a predetermined value.

The signal quality control apparatus 100 transmits a leftward/rightward adjustment signal including the rotation direction and the rotation angle, which are determined in step 'S150', to the clamping device 10 (S160). Therefore, the clamping device 10 may adjust the rotation of the antenna 1 on the basis of the received leftward/rightward adjustment signal.

Thereafter, the signal quality control apparatus 100 repeatedly performs steps 'S120', 'S130', 'S140', 'S150', 'S160', 'S170', and 'S180' until the signal quality control apparatus 100 transmits an Nth leftward/rightward adjustment signal including the rotation direction and the rotation angle, which are determined on the basis of nth data received from an nth terminal, to the clamping device 10.

Therefore, the clamping device 10 adjusts the rotation of the antenna 1 in the leftward/rightward direction n times. However, the case in which the difference value is 0 (or within the error range) in step 'S140' may be excluded. The signal quality control apparatus 100 performs the process after 'A' in FIG. 9 after the signal quality control apparatus 100 transmits the nth leftward/rightward adjustment signal to the clamping device 10.

Referring to FIG. 9, the signal quality control apparatus 100 checks whether the difference value between the target signal quality value QR based on the transmitted signal of the antenna 1 and the signal quality measurement value QN based on the nth data lastly measured in FIG. 8 is 0 (or within the error range). When the difference value is 0 (or within the error range) (S210), the signal quality control apparatus 100 may determine that the signal quality of the antenna 1 satisfies the target value and stop the operation of controlling the signal quality.

Meanwhile, when the difference value is not 0 (or within the error range) in step 'S210', the signal quality control apparatus 100 requests the first data again from the first terminal 21 among the n terminal devices 20 disposed within the network (S220 and S230).

Thereafter, when the signal quality control apparatus 100 receives the first data from the first terminal 21 (S240), the signal quality control apparatus 100 checks whether the difference value between the target signal quality value QR based on the transmitted signal of the antenna 1 and the signal quality measurement value Q1 based on the first data is 0 (or within the error range). When the difference value is 0 (or within the error range) (S250), the signal quality control apparatus 100 requests the second data from the next second terminal 22 (S290, and S230).

Meanwhile, when the difference value is not 0 (or within the error range) in step 'S250', the signal quality control apparatus 100 determines the rotation direction as the upward/downward direction and determines the rotation angle in the upward/downward direction (S260). In this case, the signal quality control apparatus 100 may determine the rotation angle on the basis of the difference value in step 'S250' or determine the rotation angle as a predetermined value.

The signal quality control apparatus 100 transmits an upward/downward adjustment signal including the rotation direction and the rotation angle, which are determined in step 'S260', to the clamping device 10 (S270). Therefore, the clamping device 10 may adjust the upward and downward rotations of the antenna 1 on the basis of the received upward/downward adjustment signal.

Thereafter, the signal quality control apparatus 100 repeatedly performs steps 'S230', 'S240', 'S250', 'S260', 'S270', 'S280', and 'S290' until the signal quality control apparatus 100 transmits an nth upward/downward adjustment signal including the rotation direction and the rotation angle, which are determined on the basis of the nth data received from the nth terminal, to the clamping device 10.

Therefore, the clamping device 10 adjusts the rotation of the antenna 1 in the upward/downward direction n times. However, the case in which the difference value is 0 (or within the error range) in step 'S250' may be excluded.

The signal quality control apparatus 100 may perform again the operation from step 'S110' in FIG. 8 when the signal quality of the antenna 1 does not satisfy the target value even after the nth leftward/rightward adjustment signal is transmitted to the clamping device 10. As another example, when the signal quality does not satisfy the target value even after the rotations of the antenna in the leftward, rightward, upward, and downward directions are adjusted, the signal quality control apparatus 100 may inform this situation and stop the related operation.

The embodiment of the method of controlling signal quality of an antenna according to the present invention using the apparatus for controlling signal quality of an antenna, which is configured as described above, will be briefly described below.

Referring to FIGS. 6 to 9, the embodiment of the method of controlling signal quality of an antenna according to the present invention includes: requesting the signal quality measurement data in a predetermined order from any one of the plurality of terminal devices disposed at the predetermined positions within the network; calculating the signal quality measurement value of the antenna on the basis of the signal quality measurement data received from any one of the terminal devices; comparing the target signal quality value of the antenna with the calculated signal quality measurement value and determining the rotation direction and the angle of the antenna on the basis of the difference value; and transmitting the adjustment signal including information on the determined rotation direction and the determined angle of the antenna to the clamping device configured to adjust the rotation of the antenna.

In this case, the requesting of the signal quality measurement data is a step performed by the communication unit 120 configured to receive the signal quality measurement data from the plurality of terminal devices 20 disposed at the predetermined positions within the network, i.e., a step of requesting the signal quality measurement data from the terminal device 20 in the predetermined order among the plurality of terminal devices 20, i.e., electronic terminals each having a communication function.

Further, the calculating of the signal quality measurement value is a step of determining the rotation angle adjustment value of the antenna 1 in the leftward/rightward direction and/or the upward/downward direction on the basis of the quality measurement data which is requested in the requesting of the signal quality measurement data and is then received from the corresponding terminal device 20. The calculating of the signal quality measurement value may be defined as a step performed by the signal quality calculation unit 140 and the rotation determination unit 150.

Further, the transmitting of the adjustment signal to the clamping device is a step of transmitting the adjustment signal including the information on the rotation direction and the angle of the antenna to the clamping device by using the control unit 110 when the rotation angle adjustment value of the antenna 1 is determined by the determining of the rotation direction and the angle of the antenna.

The above description is simply given for illustratively describing the technical spirit of the present invention, and those skilled in the art to which the present invention pertains will appreciate that various changes and modifications are possible without departing from the essential characteristic of the present invention.

Therefore, the exemplary embodiments disclosed in the present invention are provided for illustrative purposes only but not intended to limit the technical spirit of the present invention. The scope of the technical spirit of the present invention is not limited thereby. The protective scope of the present invention should be construed based on the following claims, and all the technical spirit in the equivalent scope thereto should be construed as falling within the scope of the present invention.

INDUSTRIAL APPLICABILITY

The present invention provides the apparatus and method for controlling signal quality of an antenna, which are capable of easily adjusting the rotation angle of the antenna and providing the signal quality of the antenna at a high level of satisfaction.

The invention claimed is:

1. An apparatus for controlling signal quality of an antenna, the apparatus comprising:
   a communication unit configured to receive signal quality measurement data from a plurality of terminal devices disposed at predetermined positions within a network;
   a signal quality calculation unit configured to calculate a signal quality measurement value of an antenna based on the signal quality measurement data received from any one of the plurality of terminal devices; and
   a rotation determination unit configured to compare a target signal quality value of the antenna with the calculated signal quality measurement value and determine a rotation direction and an angle of the antenna on the basis of a difference value between the target signal quality value and the signal quality measurement value,
   wherein a rotation of a clamping device is adjusted on the basis of an adjustment signal including information on the determined rotation direction and the determined angle of the antenna,
   wherein the rotation determination unit is configured to determine a rotation angle in an upward/downward direction of the antenna when the signal quality measurement data received from the terminal device are data received again.

2. The apparatus of claim 1, further comprising:
   a control unit configured to transmit the adjustment signal to the clamping device to adjust a rotation of the antenna.

3. The apparatus of claim 2, wherein the control unit is configured to request the signal quality measurement data in a predetermined order from any one of the plurality of terminal devices, and the control unit is further configured to request the signal quality measurement data from the next terminal device after the rotation of the antenna is adjusted on the basis of the adjustment signal.

4. The apparatus of claim 3, wherein the rotation determination unit is configured to determine a rotation direction of the antenna as a direction identical to a previously determined rotation direction when a second difference value between the target signal quality value of the antenna and a signal quality measurement value calculated on the basis of the signal quality measurement data received from the next terminal device is smaller than a first difference value calculated previously, and
   wherein the rotation determination unit is configured to determine a rotation direction of the antenna as a direction opposite to the previously determined rotation direction when the second difference value is equal to or larger than the first difference value calculated previously.

5. The apparatus of claim 2, wherein the rotation determination unit is configured to determine that the signal quality of the antenna does not satisfy a target value and determine the rotation angle in a leftward/rightward direction of the antenna when the difference value is not 0 or deviates from a predetermined error range.

6. The apparatus of claim 5, wherein the control unit is configured to request again the signal quality measurement data in the predetermined order from any one of the plurality of terminal devices when the signal quality of the antenna does not satisfy the target value after the rotation angle in the leftward/rightward direction of the antenna is adjusted on the basis of the signal quality measurement data sequentially received from the plurality of terminal devices.

7. The apparatus of claim 5, wherein the control unit is configured to determine to stop the rotation of the antenna when the signal quality of the antenna satisfies the target value after the rotation angle in the leftward/rightward direction of the antenna is adjusted on the basis of the signal quality measurement data sequentially received from the plurality of terminal devices.

8. The apparatus of claim 2, wherein the clamping device comprises:
   a tilting unit to which the antenna is coupled to be tiltable in the upward/downward direction; and
   a rotation unit to which the antenna is coupled to be rotatable in a leftward/rightward direction, and
   wherein the control unit is configured to transmit the adjustment signal to the clamping device, tilts the antenna in the upward/downward direction by using the tilting unit, and rotates the antenna in the leftward/rightward direction by using the rotation unit.

9. The apparatus of claim 8, wherein when the clamping device receives the adjustment signal, the clamping device operates a tilting rotation motor included in the tilting unit and configured to electrically operate to tilt the tilting unit in the upward/downward direction, and the clamping device operates a rotating rotation motor included in the rotation unit and configured to electrically operate to rotate the rotation unit in the leftward/rightward direction.

10. A method of controlling signal quality of an antenna, the method comprising:
- requesting signal quality measurement data in a predetermined order from any one of a plurality of terminal devices disposed at predetermined positions within a network;
- calculating a signal quality measurement value of the antenna on the basis of the signal quality measurement data received from any one of the terminal devices;
- comparing a target signal quality value of the antenna with the calculated signal quality measurement value and determining a rotation direction and an angle of the antenna on the basis of a difference value between the target signal quality value and the signal quality measurement value; and
- transmitting an adjustment signal including information on the rotation direction and the determined angle of the determined antenna to a clamping device configured to adjust a rotation of the antenna,
- wherein the determining comprises determining a rotation angle in an upward/downward direction of the antenna when the signal quality measurement data received from the terminal device are data received again.

* * * * *